Nov. 13, 1945.  R. C. HAFERL ET AL  2,388,912
SCALE
Filed March 4, 1944   3 Sheets-Sheet 1

INVENTORS
Rolf C. Haferl
August F. Hohne
BY Duell, Kane and Smoot
ATTORNEYS

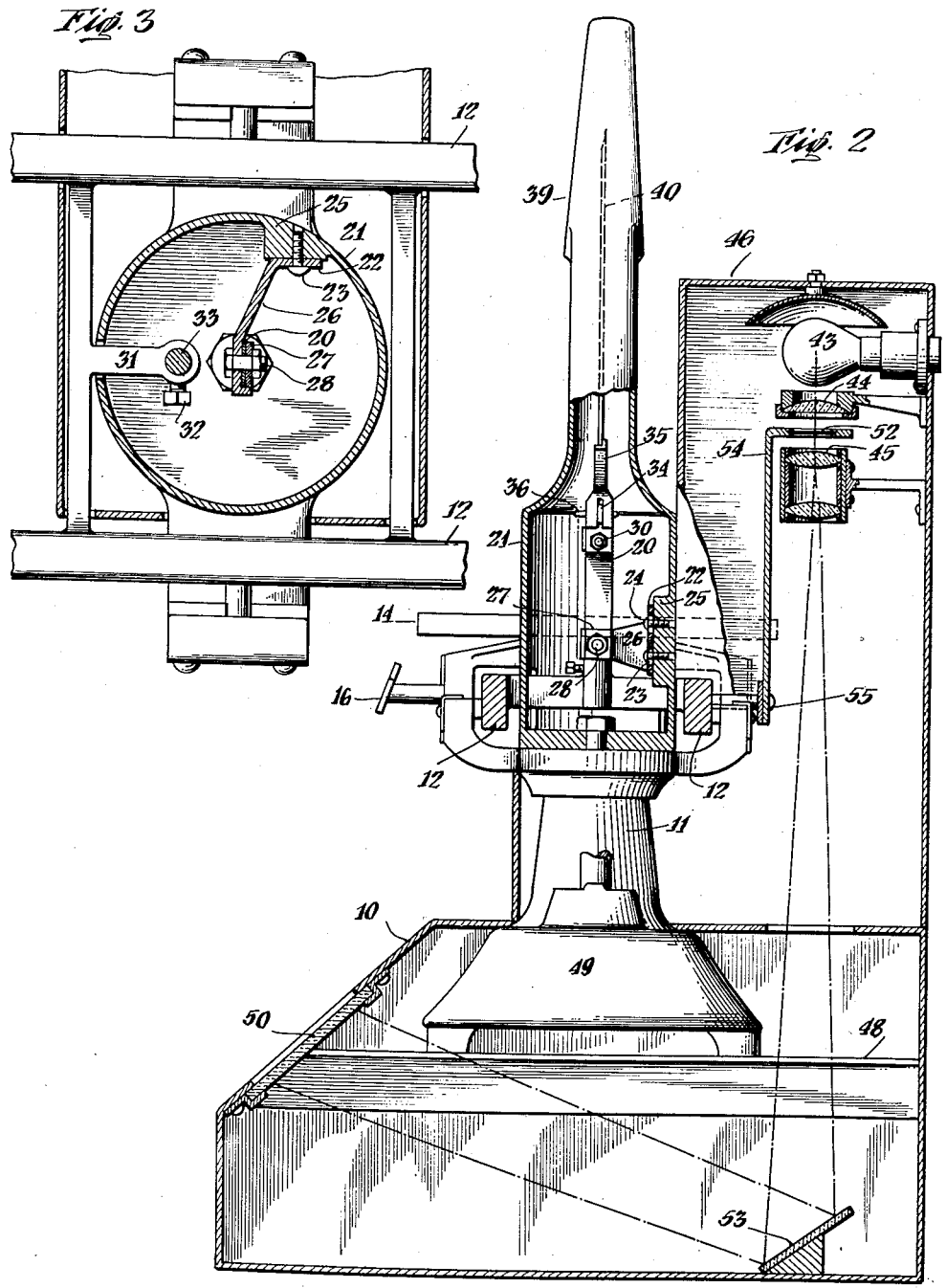

Nov. 13, 1945.   R. C. HAFERL ET AL   2,388,912
SCALE
Filed March 4, 1944   3 Sheets-Sheet 3
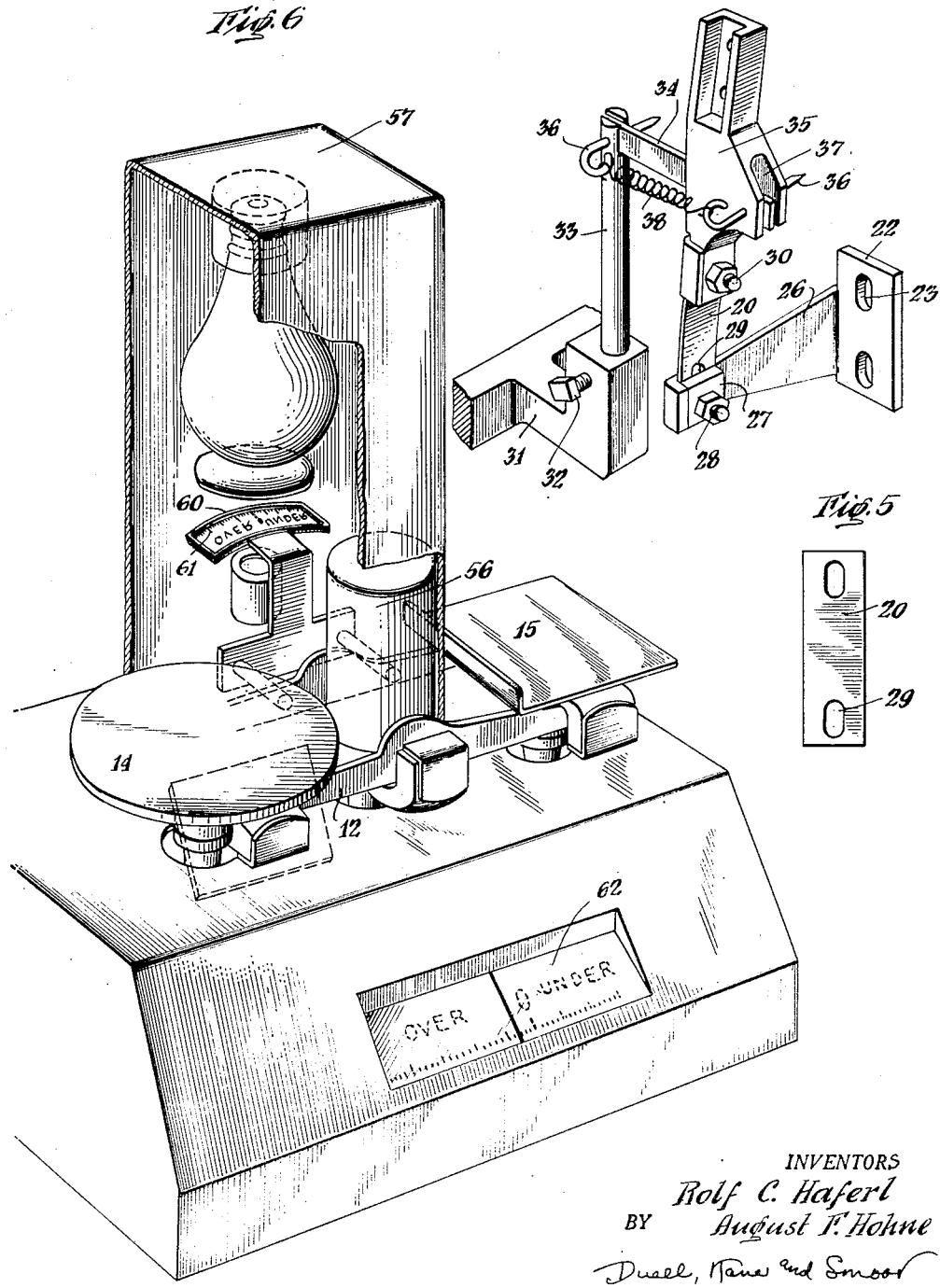
INVENTORS
Rolf C. Haferl
August F. Hohne
BY
Duell, Kane and Smoor
ATTORNEYS Patented Nov. 13, 1945

2,388,912

UNITED STATES PATENT OFFICE 2,388,912

SCALE

Rolf C. Haferl, New York, and August F. Hohne, Brooklyn, N. Y., assignors to The Jacobs Bros. Co., Inc., Brooklyn, N. Y., a corporation of New York Application March 4, 1944, Serial No. 525,022

8 Claims. (Cl. 88—24)

This invention relates to a structurally and functionally improved weighing apparatus.

It is an object to provide an assembly of this character which will include relatively few and individually simple and rugged parts; such parts being capable of ready manufacture and association with each other to furnish a unitary structure operating over long periods of time with freedom from all difficulties.

It is a further object to furnish an improved mechanism which, in its more specific aspects, may be of the "even-balance" type and by means of which any departure from a proper condition of balance will be indicated or registered in a readily comprehensible manner.

A still further object is that of furnishing a mechanism by means of which the results traversed in the preceding paragraphs will be capable of accomplishment and, in which moreover, the amount or value of the over- or under-weight will be clearly indicated.

With these and other objects in mind, reference is had to the attached sheets of drawings illustrating practical embodiments of the invention, and in which:

Fig. 2 is a sectional side view taken along the lines 2—2 and in the direction of the arrows as indicated in Fig. 1;

Fig. 3 is a transverse sectional view taken along the lines 3—3 and in the direction of the arrows as also indicated in Fig. 1;

Fig. 4 illustrates in perspective a fragment of the operating mechanism of the scale;

Fig. 5 is a face view of a detail of such mechanism;

Fig. 6 is a perspective view of an alternative form of scale mechanism; and

Figures 1, 7:
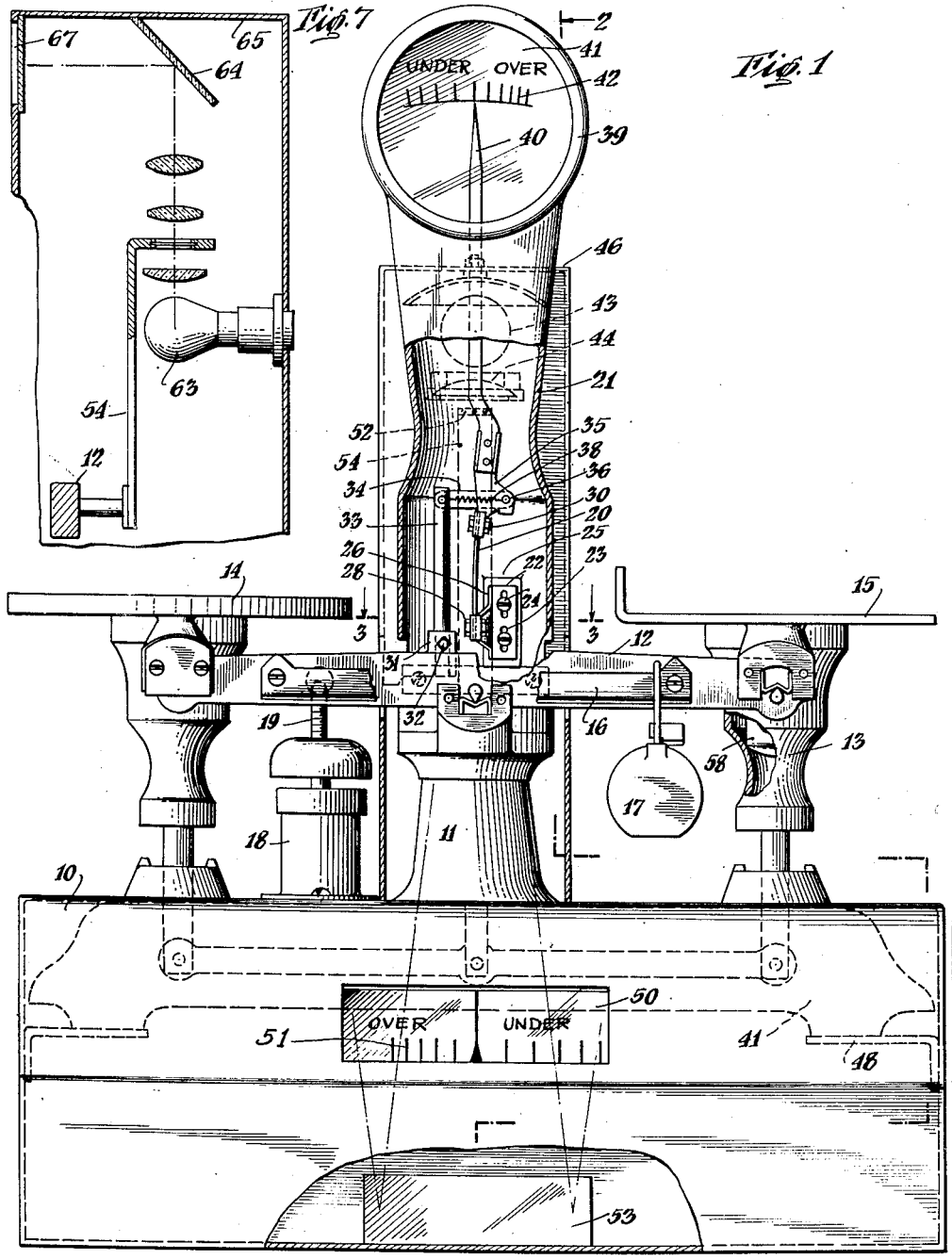
Fig. 1 is a front elevation of a scale with certain of the parts thereof broken away to disclose underlying constructions.
Fig. 7 is a somewhat diagrammatic sectional side view of a still further arrangement of certain of the scale parts.

In these views, the reference numeral 10 indicates the base of the scale and from which a support 11 extends upwardly. A beam 12 of any suitable type is pivotally mounted upon the support 11 and in turn carries pan supports 13. Suitably associated with these are platforms or pans 14 and 15. The beam 12 may have associated with it a weight support 16, upon which a weight 17 is movably mounted.

The foregoing structures are more or less conventional and may, of course, take numerous alternative forms. Likewise, any suitable and proper accessories may be associated with the beam. For example, a dash pot 18 may be coupled to the beam by a stem 19. Again, it will be apparent that any suitable movement-dampening mechanism may be employed to achieve the desired results.

It will be understood by those conversant with the scale art that scales of this general type are frequently employed with a weight of fixed value in association or mounted upon the support 14. A successive series of articles to be weighed are disposed sequentially upon the support 15. The weight-value of the articles placed upon the support 15 should be equal to the value of the weight (not shown) upon the support 14. It is, of course, apparent that equalization of values may, in many instances, not occur, and it is the purpose of the present mechanism not alone to indicate this factor but also to clearly register the value of the over- or under-weight which occurs in connection with any given article.

In order to furnish a mechanism suitable for resisting movements of the beam, it is preferred to employ a flexion strip 20. This strip is disposed within a housing 21 conveniently mounted upon the support 11. A bracket 22 is formed with slots 23. Through these, mounting bolts 24 or their equivalents extend to secure the bracket against movement with respect to a mounting portion 25 which may form a part of the housing 21. The bracket is conveniently formed with an arm portion 26. A pad member 27 is formed with an opening through which the shank of a bolt and nut assembly may extend. This shank also extends through an opening in the arm 26 as well as the lower opening 29 of the flexion strip 20. When the nut of the assembly 28 is tightened, it is obvious that the flexion strip will be clamped against shifting with respect to the bracket.

The beam 12 is provided with an extension 31. This is conveniently formed with an opening or socket portion into which a clamping bolt or set screw 32 extends. This bore receives one end of a stud 33. Obviously, the latter may be clamped against movement with respect to the extension 31 by tightening the bolt 32. The upper end of the stud 33 is conveniently slotted to accommodate one end of a link 34. The opposite end of this link extends adjacent a member 35 which may perform functions hereinafter specified. In order to connect the link 34 with the stud 33 and member 35, pin 36 may be employed. Also, the member 35 is conveniently notched or slotted as at 37 to accommodate the adjacent end of the link. If desired, a tension spring 38 may be mounted to extend between the pin 36. This will serve to prevent any play's occurring between the parts and which would normally result in inaccuracy of the result registered by the scale.

While the parts might be connected in a manner such that when the beam 12 is in even-balance condition, the flexion strip 20 would extend in a straight line, it is preferred that the latter be under tension when the beam is in such neutral position. This will avoid the factor of having the flexion strip under no stress with the parts in such position. Consequently, whether a condition of over- or under-weight exists, the results will be registered with greater accuracy due to the initially stressed condition of the flexion strip.

Conveniently, such a condition is assured by having the link 34 of improper length to permit the flexion strip to extend in a straight line when the beam is in even-balanced condition. As shown, it is desirable that such link be of excess length. Therefore, with the parts arranged in the manner shown in Fig. 1, the strips will be bowed to the right with the beam in even-balance condition. Obviously, aside from the adjustment afforded by the possibility of shifting the bracket 22 with reference to the supporting portion of the housing, the stud 33 may be axially adjusted by simply loosening the bolts 32 and shifting the stud in the desired direction. Additionally, the effective length of the flexion strip may be altered by loosening the assembly 28 and shifting the strip upwardly and downwardly (as desired) with reference to the bracket arm 26. Further and similar adjustment may be effected by loosening the assembly and correspondingly shifting the member 35 with respect to the strip and thereupon tightening the assembly. Obviously, as the effective length of the strip is reduced, the degree of resistance to movement exerted by the same is increased. Conversely, as the effective length of the strip is increased, its resistance to movement is decreased, or in other words, it becomes more flexible.

As shown particularly in Fig. 1, the housing 21 may be extended to provide adjacent its upper end a window or opening 39. Extending into the area of this aperture is a pointer 40 which is suitably secured to the member 35. This pointer traverses or moves adjacent the edge of a chart 41 upon which indicia 42 is displayed. As illustrated, one-half of the chart may provide for indications of over-weight while the other half of the chart provides for conditions of under-weight. Having in mind that the strip 20 is placed in an initial condition of tension, it will be understood that with the illustrated arrangement of the parts greater resistance to movement will occur as the right end of beam 12 is depressed than if the left end or platter 14 associated with that beam end is moved downwardly. In order to compensate for the initial tension of the flex, a weight 58 may be associated with the right hand support 13. Also, to provide for accuracy of indication, the indicia 42 associated with the portion of the chart which registers over-weight may be more closely spaced than the corresponding valuations on the other side of the chart. This has been generally illustrated in the drawings. In actual practice, however, it will be understood that spacing of the graduations may not present the pronounced difference which has been illustrated. Rather, the unequal travel is compensated for by providing graduations in accordance with beam depression effected by placing test weights on the support.

According to the present invention, it is proposed to combine with the weighing mechanism a projection system such that the operator, without fatigue or eyestrain, may readily observe the weight value of the articles being weighed and may also determine the amount of over- or under-weight of those articles. To this end, the system preferably includes a light source and suitable lens assembly, as well as a screen. Connected to the scale mechanism is an indicator which, in cooperation with the light source and lens assembly, may provide for a light image upon the screen and which image will convey to the operator the information which he is to receive.

As illustrated especially in Figs. 1 to 4, this assembly includes the light 43, to the rear of which a reflector may be disposed. In advance of the light, a condenser lens 44 is mounted. In turn beyond the latter, an objective lens assembly 45 may be provided. Conveniently, these several parts are arranged within a casing 46 which may be disposed to the rear of the housing 21. The base 10 is hollow and may mount upon suitable supports 48 the base proper 49 of the scale. The front portion of the base or casing 10 may be formed with an opening within which a screen 50 is mounted. This screen may be in the form of a translucent or frosted piece of glass or embody any other desired construction. Upon its face and as shown in Fig. 1, this screen may present indicia 51. A shadow-creating element 52 is mounted upon an arm 54 conveniently secured at 55 to move with the scale beam. To this end, it is preferably disposed in line with the main supporting pivots of the latter. The element 52 moves between the condenser and objective assemblies 44 and 45. A mirror 53 is mounted within the base or casing 10 and in line with the optical axis of the lens assembly. Consequently, light images are projected onto the surface of this mirror. The screen 50 is in turn properly related to this mirror. Therefore, the light image is reflected under the base 49 and onto the screen.

It follows that as the beam oscillates to cause the pointer 40 to traverse the indicia of chart 41, the element 52 is correspondingly moved. This element will create a shadow (preferably in line form) which will be projected through the objective assembly 45 onto the mirror 53. A corresponding light image will appear upon the screen 50. Again on the latter the graduations or other indicia 51 are preferably arranged in the same manner as described in connection with the graduations 42 and in order to compensate for the initially flexed condition of the strip 20. Therefore, the projected light image appearing upon the screen will indicate to the operator precisely the weight value of the article which is being weighed.

In the form of construction shown in Fig. 6, reference numerals as heretofore employed have again been utilized to indicate corresponding parts. In this form of construction, it will be observed that the casing or housing 21 has been supplanted by a housing 56, within which the flexion strip and its associated or equivalent parts (not shown) may be disposed. Also, the casing 57 corresponding to the casing 46 may be somewhat enlarged and be provided with no window or pointer. In common with the construction of the preceding figures, the strip 20 is preferably initially tensioned or flexed. Also in common with the preceding constructions, the resultant biased tendency of the strip may be counteracted by means of a weight 58 conveniently associated with the proper support 13 mounted by the beam 12. A shadow-creating element similar to the element 52 may be employed. If this is not desired, then an element 60 in the nature of a transparent plate may be mounted by the arm which traverses this space between the condenser and objective assemblies. This plate will bear thereon indicia 61. Again, if the flexion strip or its equivalent is placed in an initial condition of tension, compensation will be made in the arrangement of the indicia. In any event, the light image will be projected upon the screen 62 mounted by the base of the apparatus. This screen, contrary to the screen 50, will preferably provide an unobstructed or non-indicia-bearing surface. This may be excepting only a registering line or mark.

In the fragment of apparatus illustrated in Fig. 7, it will be observed that contra to the previously described constructions, the light source or lamp 63 is arranged below the shadow-projecting element and irrespective of whether the latter be of the type indicated by the reference numerals 52 or 60 and 61. The resultant image is projected onto the screen 64. From the surface of the latter, it is reflected to a screen 67 disposed within an aperture formed in the casing 65. Thus, a projected image appears upon this screen and adjacent the upper end of the casing.

In all the several forms of apparatus herein illustrated and described, it will be appreciated that an extremely simple construction is involved. In such forms, the indicating member cooperating with the projection system is moved in an arc which has as its center the fulcrum of the beam. Accordingly, sharp definition may be maintained. It will be seen that when the parts have once been assembled and correlated, the mechanisms will function over long periods of time with freedom from all difficulties. When some adjustment does become necessary, this may readily be accomplished. Other than requiring periodic cleaning and renewal of the light source, virtually no additional service requirements should occur.

Thus, among others, the several objects of the invention as specifically aforenoted are accomplished. Obviously, numerous changes in construction and rearrangements of the parts might be resorted to without departing from the spirit of the invention as defined by the claims.

We claim:

1. In combination a scale including a pivotally mounted beam, a support extending rearwardly of said beam and movable with the same, a source of light, a lens assembly adjacent such source, a screen to receive a light image projected by said assembly, means for creating an indicating shadow upon said screen, said means being carried by said support and extending in operative relationship to said assembly and substantially in line with the beam pivots, a substantially flat flexion strip, means for supporting one end of said strip to extend substantially in line with the point of pivotal mounting of said beam, means for connecting the opposite end of the same with said beam, and means for causing said strip to be placed under tension and accordingly bowed when said scale beam is in an even-balance condition.

2. In combination a scale including a pivotally mounted beam, a support extending rearwardly of said beam and movable with the same, a source of light, a lens assembly adjacent such source, a screen to receive a light image projected by said assembly, means for creating an indicating shadow upon said screen, said means being carried by said support and extending in operative relationship to said assembly and substantially in line with the beam pivots, a flexion strip, means for supporting said flexion strip, means for connecting said flexion strip to move with said beam, means whereby said strip is placed under an initial condition of tension with said beam in even-balance condition, and whereby said beam offers greater resistance to movement in one direction than in an opposite direction, and means included in said shadow-creating means for compensating in the result registered on said screen for inequalities in resistance to beam movement.

3. In combination a scale including a pivotally mounted beam, a support extending rearwardly of said beam and movable with the same, a source of light, a lens assembly adjacent such source, a screen to receive a light image projected by said assembly, means for creating an indicating shadow upon said screen, said means being carried by said support and extending in operative relationship to said assembly and substantially in line with the beam pivots, means for yieldingly resisting movements of said means from a condition of even-balance, and registering means connected with said last-named means and with said beam, said registering means moreover indicating the amounts of beam deflection in a manner additional to the indication provided on the screen.

4. In combination a scale including a pivotally mounted beam, a support extending rearwardly of said beam and movable with the same, a source of light, a lens assembly adjacent such source, a screen to receive a light image projected by said assembly, means for creating an indicating shadow upon said screen, said means being carried by said support and extending in operative relationship to said assembly and substantially in line with the beam pivots, means for yieldingly resisting movements of said means from a condition of even-balance, means for placing said last-named means under an initial condition of stress and whereby movements of said beam in one direction are resisted to a greater extent than movements of said beam in an opposite direction, a pointer and dial connected to said resisting means and beam for registering the amount of beam deflection, and means associated with said pointer and dial, and shadow-creating means for compensating in the results registered by said pointer and dial and upon said screen for any such inequalities of resistance to movement on the part of said beam.

5. A scale including in combination a pivotally mounted beam, a casing extending rearwardly and substantially in line with the pivots of said beam, a support also extending rearwardly of said beam and within said casing, said support moving with said beam, a source of light, a lens assembly adjacent the same and both said source and assembly being disposed within said casing, a screen to receive a light image projected by said assembly, means for creating an indicating shadow upon said screen, said means being carried by said support and extending in operative relationship to said assembly and substantially in line with the beam pivots, means for yieldingly resisting movements of said beam from a condition of even-balance, a second casing co-extensive with said first-named casing and extending forwardly and below the mounting of said beam, said second casing providing a support for said screen, and a mirror disposed below said beam and to receive the light image projected by said assembly and to reflect the same to said screen.

6. A scale including in combination a pivotally mounted beam, a casing extending rearwardly and substantially in line with the pivots of said beam, a support also extending rearwardly of said beam and within said casing, said support moving with said beam, a source of light, a lens assembly adjacent the same and both said source and assembly being disposed within said casing, a screen to receive a light image projected by said assembly, means for creating an indicating shadow upon said screen, said means being carried by said support and extending in operative relationship to said assembly and substantially in line with the beam pivots, means for yieldingly resisting movements of said beam from a condition of even-balance, a second casing co-extensive with said first-named casing and extending forwardly and below the mounting of said beam, said second casing providing a support for said screen, a mirror disposed below said beam and to receive the light image projected by said assembly and to reflect the same to said screen; the mounting for said beam including a base, and means associated with said second casing and extending above said mirror to support said base within said second casing.

7. A scale including in combination a base, a beam pivotally mounted thereby, a casing extending rearwardly above said beam, downwardly below the same and below and across said base, the forward end of the latter part of said casing being formed with an opening, a screen disposed within said opening, reflecting means disposed adjacent the lower end of said casing and to the rear of said beam, shadow-creating means mounted by said beam and extending upwardly above the same within said casing, light-creating means disposed within said casing above said shadow-creating means and directed towards said reflecting means whereby, as a result of said shadow-creating means, a shadow will be created upon said screen, a substantially straight flexion strip having one of its ends connected to said beam to resist movements of the latter, and means for connecting the opposite end of said strip with said base.

8. A scale including in combination a base, a beam pivotally mounted thereby, a casing extending rearwardly above said beam, downwardly below the same and below and across said base, the forward end of the latter part of said casing being formed with an opening, a screen disposed within said opening, reflecting means disposed adjacent the lower end of said casing and to the rear of said beam, shadow-creating means mounted by said beam and extending upwardly above the same within said casing, light-creating means disposed within said casing above said shadow-creating means and directed towards said reflecting means whereby, as a result of said shadow-creating means, a shadow will be created upon said screen, a substantially straight flexion strip having one of its ends connected to said beam to resist movements of the latter, means for connecting the opposite end of said strip with said base, and registering means also connected to said one end of the flexion strip to indicate the degree of deflexion of said beam from an even-balance condition.

ROLF C. HAFERL.
AUGUST F. HOHNE.